(12) United States Patent  
Monsen et al.

(10) Patent No.: US 8,219,322 B2  
(45) Date of Patent: Jul. 10, 2012

(54) PROCESSING OF STRATIGRAPHIC DATA

(75) Inventors: Erik Monsen, Hafrsfjord (NO); Hilde Grude Borgos, Hafrsfjord (NO); Torbjorn Eikli Smorgrav, London (GB); Lars Sonneland, Tananger (NO)

(73) Assignee: Schlumberger Technology Corporation, Sugar Land, TX (US)

( * ) Notice: Subject to any disclaimer, the term of this patent is extended or adjusted under 35 U.S.C. 154(b) by 129 days.

(21) Appl. No.: 11/950,870

(22) Filed: Dec. 5, 2007

(65) Prior Publication Data

US 2008/0140319 A1    Jun. 12, 2008

(30) Foreign Application Priority Data

Dec. 6, 2006    (GB) .................................. 0624390.1

(51) Int. Cl.
*G01V 1/00*    (2006.01)
*G01R 13/02*    (2006.01)

(52) U.S. Cl. ................ 702/16; 702/17; 702/18; 702/68; 702/70

(58) Field of Classification Search .............. 702/16–18, 702/66–70, 121–123, 179–189; 703/10
See application file for complete search history.

(56) References Cited

U.S. PATENT DOCUMENTS

| | | | |
|---|---|---|---|
| 5,808,966 A * | 9/1998 | Calvert et al. | ................... 367/73 |
| 6,708,118 B2 | 3/2004 | Stark | |
| 6,771,800 B2 * | 8/2004 | Keskes et al. | ................. 382/109 |
| 6,850,845 B2 | 2/2005 | Stark | |
| 6,853,922 B2 | 2/2005 | Stark | |
| 7,248,539 B2 | 7/2007 | Borgos et al. | |
| 7,257,488 B2 * | 8/2007 | Cacas | ................................ 702/2 |
| 2006/0100837 A1 * | 5/2006 | Symington et al. | ............. 703/10 |
| 2008/0285384 A1 * | 11/2008 | James | .............................. 367/72 |

FOREIGN PATENT DOCUMENTS

WO    9837437    8/1998

OTHER PUBLICATIONS

Bengoetxea, Endika, "Inexact graph matching using estimation of distribution algorithms", PhD Thesis, Ecole Nationale Superieure des Telecommunications, Dec. 19, 2002.
Monsen et al. "Mathematical methods and modeling in hydrocarbon exploration and production", vol. 6 of Mathematics in industry, Chapter Geological Model Building: A hierarchical segmentation approach, pp. 213-245. Springer-Verlag, Heidelberg, 2004.
Borgos et al., "Mathematical methods and modeling in hydrocarbon exploration and production", vol. 6 of Mathematics in Industry, Chapter Automated structural interpretation through classification of seismic horizons, pp. 89-106, Springer-Verlag, Heidelberg, 2004.

(Continued)

*Primary Examiner* — Phuong Huynh

(57) ABSTRACT

A method of processing stratigraphic data comprising a plurality of stratigraphic features, such as horizon surfaces, within a geological volume is provided. The method includes the steps of: extending a plurality of spaced sampling traces through the volume to traverse the stratigraphic features; and assigning the stratigraphic features respective relative geological ages. On each sampling trace, the relative geological age of each stratigraphic feature traversed by the sampling trace in the direction from geologically younger to geologically older stratigraphic features is increased in relation to the relative geological age of its preceding stratigraphic feature, under the condition that each stratigraphic feature takes the same relative geological age across all the sampling traces by which it is traversed.

11 Claims, 10 Drawing Sheets

OTHER PUBLICATIONS

Schlaf et al.. "Mathematical methods and modeling in hydrocarbon exploration and production", vol. 6 of Mathematics in industry, Chapter Introduction to seismic texture, pp. 3-21, Springer-Verlag, Heidelberg, 2004.

Lamport, "The temporal logic of actions", ACM Trans. Program. Lang. Syst., 16(3):872-923, 1994.

Vincent et al. Watersheds in digital spaces: an efficient algorithm based on immersion simulations. IEEE Trans. on Pattern Analysis & Machine Intelligence, 13(6):583-598, 1991.

Gonzalez et al.. "Digital image processing", Addison-Wesley Publishing Company, pp. 532-534, 1992.

Mitchum et al. "Seismic stratigraphy applications to hydrocarbon exploration", Chapter Seismic stratigraphy and global changes of sea level, Part 6, AAPG Memoir 26, pp. 117-133, 1977.

Mitchum et al., "Seismic stratigraphy applications to hydrocarbon exploration", Chapter Seismic stratigraphy and global changes of sea level, Part 7, AAPG Memoir 26, pp. 135-143, 1977.

Grimaldi, "Discrete and combinatorial mathematics—an applied introduction", Addison-Wesley, 3rd edition 1994, pp. 371-379.

Pedersen et al, New paradigm of fault interpretation. In Expanded Abstr., Int. Mtg., Soc. Expl. Geophys., Oct. 2003.

Cormen et al., Introduction to algorithms, MIT Press, pp. 477-488, 1996.

* cited by examiner

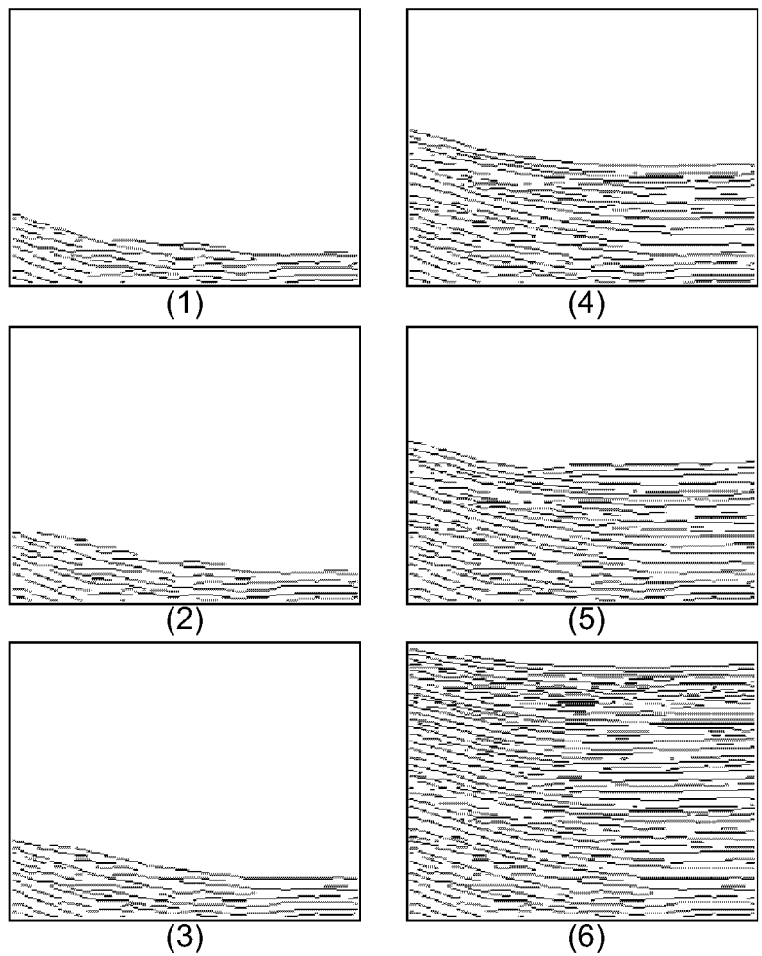
Fig. 10
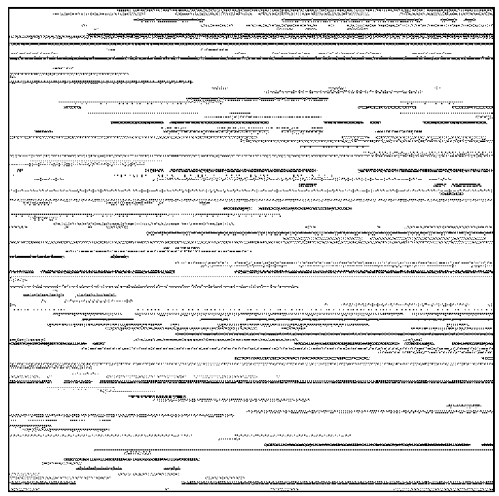
Fig. 11a    Fig. 11b

Geobody generation    Sequence boundary    3D Chronostratigraphic chart
                         indicator

PROCESSING OF STRATIGRAPHIC DATA

FIELD OF THE INVENTION

The present invention relates to a method of processing stratigraphic data.

BACKGROUND OF THE INVENTION

Stratigraphy is fundamental to the discipline of geology in describing the spatial, geometrical, structural, sequential and temporal relationships of rock units. In response to the formation of rocks in highly variable depositional environments and with varying sedimentary compositions, stratigraphic approaches span a wide range of disciplines, such as, litho-, bio-, chrono-, magneto-, seismic-, sequence- and chemo-stratigraphy.

Generally, in early stage geological exploration, little or no information is available on sediment characteristics. The identification and analysis of a potential hydrocarbon reservoir is a matter of interpretation and analysis of seismic reflection data.

Seismic surveying is generally performed by imparting energy to the earth at one or more source locations, for example, by way of controlled explosion, mechanical input etc. Return energy is then measured at surface receiver locations at varying distances and azimuths from the source location. The travel time of energy from source to receiver, via reflections and refractions from interfaces of subsurface strata, indicates the depth and orientation of such strata.

Seismic images indirectly depict the distribution of material deposited over large areas. Exploiting the fact that different seismic signatures characterize different depositional settings, seismic sequence stratigraphy can be used to infer depositional settings and their spatial and temporal distribution.

Deciphering geological history in this way enables analysis and estimation of probable sedimentary characteristics. However, performing sequence stratigraphic analysis over large seismic volumes is a daunting task, particularly if done manually. Hence, there is a need for automated analysis tools.

US 2004/0260476 discloses a method for automated extraction of surface primitives from seismic data.

For example, one embodiment of the method of US 2004/0260476 involves defining, typically with sub-sample precision, positions of seismic horizons through an extrema representation of a 3D seismic input volume; deriving coefficients that represent the shape of the seismic waveform in the vicinity of the extrema positions; sorting the extrema positions into groups that have similar waveform shapes by applying classification techniques with the coefficients as input attributes using unsupervised or supervised classification based on an underlying statistical class model; and extracting surface primitives as surface segments that are both spatially continuous along the extrema of the seismic volume and continuous in class index in the classification volume.

Subsurface stratification results from the nature of deposition—newer sediments being deposited on top of older sediments. The spatial (and temporal) variability of stacking patterns, or sequences, observed in seismic images relates to depositional environments and post-depositional processes, such as erosion and tectonic activity.

Linking reflection patterns to depositional environments, and vertical stacking order to order of deposition and, thus, relative timing, enables the geological history of the subsurface to be deciphered.

Because stacking order relates to relative time of deposition, it can be possible to show graphically the depositional history of observed seismic data. For example, flattening the sedimentary layers and plotting them according to their time of deposition provides a useful mapping known as a chronostratigraphic chart. This is a graphic display, with geologic age along the vertical axis and distance along the horizontal axis, providing a visualisation of the relative ages and geographic extent of sediments over a given area. The time of deposition of each sediment is generally relative, unless extra information e.g. from well logs is available whereby exact dating may be performed.

U.S. Pat. No. 6,708,118 proposes a system for utilizing a geological age volume to investigate a portion of the earth in which a geologic age is selected, a search being made in the geological age volume for locations having substantially the selected geological age. U.S. Pat. No. 6,850,845 and U.S. Pat. No. 6,853,922 propose a related system and method.

SUMMARY OF THE INVENTION

An insight of the present inventors was that by appropriate sampling of horizon surfaces within a geological volume the horizon surfaces could be assigned respective relative geological ages in a methodical and self-consistent manner such that conflicts between the relative geological ages of different horizon surfaces can be avoided.

Thus, in a first aspect, the present invention provides a method of processing stratigraphic data comprising a plurality of horizon surfaces within a geological volume, the method including the steps of: extending a plurality of spaced sampling traces through the volume to traverse the horizon surfaces; and assigning the horizon surfaces respective relative geological ages such that, on each sampling trace, the relative geological age of each horizon surface traversed by the sampling trace in the direction from geologically younger to geologically older horizon surfaces is increased in relation to the relative geological age of its preceding horizon surface, under the condition that each horizon surface takes the same relative geological age across all the sampling traces by which it is traversed.

Typically the horizon surfaces are seismic horizon surfaces. Preferably the sampling traces extend substantially perpendicularly to the horizon surfaces. However, when for example some of the horizon surfaces are inclined relative to other horizon surfaces, then that inclination may be reflected in a non-perpendicular intersection between the inclined horizon surfaces and the sampling traces. Typically the sampling traces are substantially parallel to each other.

Typically, although not necessarily, the horizon surfaces are spatially continuous. Typically, the horizon surfaces correspond to interfaces between strata, although the horizon surfaces may also be used to represent boundaries of geobodies, such as hydrocarbon reservoirs or salt bodies. Indeed, more generally, the method may be used to assign relative geological ages to stratigraphic features such as horizon surfaces, geobodies or faults, the sampling traces being extended through a plurality of such features. Nonetheless, in what follows we will describe the method in relation to horizon surfaces.

An advantage of the method is that it can be applied across the entire geological volume, i.e. it is truly 3D.

The method may further include the steps of: providing each horizon surface with a unique identifier; and for each sampling trace, determining a sequence order of the unique identifiers of successively traversed horizon surfaces, the sequence orders either all starting at the unique identifiers of geologically younger horizon surfaces and ending at the unique identifiers of geologically older horizon surfaces, or all starting at the unique identifiers of geologically older horizon surfaces and ending at the unique identifiers of geologically younger horizon surfaces; wherein the step of assigning the horizon surfaces respective relative geological ages comprises sorting the unique identifiers into a linear order so that each descendant unique identifier appears later in the linear order than its parent unique identifier, a descendant unique identifier and its parent unique identifier being adjacent unique identifiers in a sequence order with the parent appearing before the descendant.

Effectively, the sequence orders thus-determined form a directed acyclic graph (DAG) in which the nodes of the DAG are the unique identifiers, and each pair of adjacent unique identifiers in a sequence order are a parent node and a descendant node in the directed acyclic graph, the outcoming edge connecting the parent node to the descendant node reflecting the ordering of the pair.

Conceiving of the unique identifiers as the nodes of a DAG captures the relationships between the unique identifiers of the sequence orders, and facilitates the description of subsequent operations on the unique identifiers. However, it is not necessary for the performance of the method to actually produce or display a DAG with the unique identifiers as the DAG nodes.

An advantage of producing the linear order is that it allows the method to be automated. A further advantage of producing the linear order is that it provides a specific (but not necessarily unique) order in which to visit the unique identifiers when assigning respective relative geological ages to the horizon surfaces so that whenever a new unique identifier is reached all of its predecessors have already been visited.

For example, the step of assigning the horizon surfaces respective relative geological ages may further comprise the substeps of: (i) associating the unique identifiers with respective initial relative geological ages; (ii) adjusting the relative geological ages of unique identifiers which are descendant unique identifiers of the first parent unique identifier in the linear order, whereby when the sequence orders start at the unique identifiers of geologically younger horizon surfaces, the adjustment is an increase in geological age if the relative geological age associated with the parent unique identifier is older than or the same age as the relative geological age associated with a descendant unique identifier, or when the sequence orders start at the unique identifiers of geologically older horizon surfaces, the adjustment is a decrease in geological age if the relative geological age associated with the parent unique identifier is younger than or the same age as the relative geological age associated with a descendant unique identifier; and (iii) repeating substep (ii) for the next and each subsequent unique identifier in the linear order which is a parent unique identifier.

Thus, due to the linear ordering of the unique identifiers, each edge, which in a DAG representation connects a parent node to a descendant node, only needs to be traversed once.

The method may further comprise a step of conveying, storing or displaying the relative geological ages.

For example, the method may further include the step of: representing the horizon surfaces and their respective relative geological ages in a chronostratigraphic chart. Such a representation advantageously reveals the depositional history of the stratigraphic data.

The stratigraphic data may be obtained by labelling (and preferably by classifying) seismic data. For example, the labelling may be performed by extracting extrema positions within the seismic data, whereby the stratigraphic data thus-obtained sparsely populates the geological volume. The extraction may be performed by classifying local signal shapes of the seismic data at extrema positions only. This can provide a better discrimination of subtle stratigraphic features.

Occasionally, e.g. on inspection of the chronostratigraphic chart, it may be apparent that horizon surfaces have been assigned incorrect relative geological ages. However, the unique identifier of such a horizon surface can be associated with an updated relative geological age, and the unique identifiers which follow in the linear order can, if necessary, likewise be associated with updated relative geological ages.

Thus, for example, the method may comprise a further step of readjusting relative geological ages by the substeps of: (a) associating a parent unique identifier with an updated relative geological age; (b) readjusting the relative geological ages of descendant unique identifiers of that parent unique identifier, whereby when the sequence orders start at the unique identifiers of geologically younger horizon surfaces, the readjustment is an increase in geological age if the relative geological age associated with the parent unique identifier is older than or the same age as the relative geological age associated with a descendant unique identifier, or when the sequence orders start at the unique identifiers of geologically older horizon surfaces, the readjustment is a decrease in geological age if the relative geological age associated with the parent unique identifier is younger than or the same age as the relative geological age associated with a descendant unique identifier; and (c) repeating substep (b) for the next and each subsequent parent unique identifier in the linear order which has had its relative geological age readjusted.

Sometimes what have been treated as different horizon surfaces turn out in fact to be part of the same horizon surface. If the different horizon surfaces already have the same relative geological ages, it is straightforward to provide a single unique identifier for all these horizon surfaces while preserving the ordering relations of the sample traces. For example, this can be achieved by selecting one of the unique identifiers of the different horizon surfaces, deleting the unique identifiers of the others of the different horizon surfaces, setting the selected unique identifier to be the parent unique identifier of the descendant unique identifiers of the deleted unique identifiers, and setting the selected unique identifier to be a descendant unique identifier of the parent unique identifiers of the deleted unique identifiers. In the sequence orders, this has the effect of substituting the deleted unique identifiers with the selected unique identifier. In the DAG representation, the nodes corresponding to the different horizon surfaces are merged into a single node which retains all the incoming and outgoing edge connections of these nodes. Readjustment of relative geological ages is not necessary.

If, however, the different horizon surfaces have different relative geological ages, then, while it is still possible to select one of the unique identifiers of the different horizon surfaces, delete the unique identifiers of the others of the different horizon surfaces, set the selected unique identifier to be the parent unique identifier of the descendant unique identifiers of the deleted unique identifiers, and set the selected unique identifier to be a descendant unique identifier of the parent unique identifiers of the deleted unique identifiers, thereafter a further step of readjusting the relative geological ages should be performed, e.g. by the procedure of substeps (a)-(c) above with the selected unique identifier being the parent unique identifier of substep (a). Preferably, in step (a), the selected unique identifier is associated with an updated relative geological age which, when the sequence orders start at the unique identifiers of geologically younger horizon surfaces, is the oldest of the relative geological ages of the selected and deleted unique identifiers, or, when the sequence orders start at the unique identifiers of geologically older horizon surfaces, is the youngest of the relative geological ages of the selected and deleted unique identifiers.

More generally, the method may further include using the classified local signal shapes to adjust the relative geological ages of surfaces on either side of a fault. Thus faults may be treated as relative age discontinuities rather than as stratigraphic features to which relative geological ages should be assigned.

In a second aspect, the present invention provides a method of processing seismic data including the steps of: performing seismic tests to obtain seismic data for a geological volume; labelling (and preferably classifying) the seismic data to obtain stratigraphic data comprising a plurality of horizon surfaces within the geological volume; and performing the method of the first aspect.

The seismic tests may be performed in a different country or jurisdiction from where the method of the first aspect is performed.

In a third aspect, the present invention provides a method of controlling a well drilling operation including the steps of: performing the method of either of the previous aspects; using the stratigraphic data thus-processed to determine a well trajectory; and drilling a well having that trajectory.

Thus the method can feed directly into the operation or control of a drilling rig. The well may be drilled in a different country or jurisdiction from where the method of the first aspect is performed.

In a fourth aspect, the present invention provides a method of representing a subterranean reservoir including the steps of: performing the method of the first aspect; using the horizon surfaces and their assigned relative geological ages to define boundaries of a geobody; associating the geobody with petro-physical properties; and combining the geobody with other geobodies to define at least a section of a reservoir.

In a fifth aspect, the present invention provides a method of processing seismic data wherein the data are evaluated in a first representation of the seismic data and in a second representation of the seismic data, wherein one of the first and second representations is a chronostratigraphic representation, and a modification in the first representation is transformed to provide a corresponding modification in the second representation for simultaneous display.

The other of the first and second representations is preferably a representation of the seismic data arranged according to signal strength and time or depth of reflection.

The modification in the first representation may include selecting a subset of the data. The corresponding modification in the second representation can then be a highlighting of the corresponding transformed data.

The modification in the first representation may include overlaying a graphical display with a symbol. The corresponding modification in the second representation can then be a corresponding overlay of a graphical display.

This aspect of the invention may be applied to further process the data of the first aspect of the invention, particularly when the first aspect of the invention includes the step of representing the horizon surfaces and their respective relative geological ages in a chronostratigraphic chart.

Thus, for example, the present invention can provide a method of automated seismic data processing in which the following workflow of procedures is typically performed:

a) identify and extract all the local stratigraphic features from a seismic data volume, b) for each extracted stratigraphic feature, compress the local seismic signal waveform into that feature's supporting area, c) build a DAG based on the local vertical order of stratigraphic features along individual seismic traces, d) analyse the DAG topology and calculate the relative geological ages of the stratigraphic features, and e) visualise the stratigraphic features in a chronostratigraphic chart in a second interpretation window.

Further aspects of the present invention provide a computer-based system for performing the method of the first, fourth or fifth aspect, a computer program product carrying a program for performing the method of the first, fourth or fifth aspect, and a computer program for performing the method of the first, fourth or fifth aspect.

BRIEF DESCRIPTION OF THE DRAWINGS

Embodiments of the invention will now be described by way of example with reference to the accompanying drawings in which:

FIG. 10 shows a series of six images from an animation of the sedimentation process on a vertical section through a seismic chart, FIG. 11 shows (a) a section through a chronostratigraphic chart and (b) a histogram of the summed horizon surface sizes at each geological age of the chart.

DETAILED DESCRIPTION

Seismic Data Modelling

A seismic data volume can be treated as being a collection of horizon surfaces (often referred to as seismic events or strata) that are defined at the positions of seismic data zero-crossings, maximum or minimum values. Known methods by which such a sparse surface representation of a seismic data volume may be obtained are diverse, including manual interpretation, connected component labelling of extrema cubes and extrema classification.

Extrema detection, in particular, is a well known concept in signal and image processing, and there are many algorithms and techniques for performing such detection. For example, applying the extrema classification method discussed in US 2004/0260476, it is possible to obtain a sub-sample precision representation of all extrema within a seismic volume using volume reflection spectral decompositions (as discussed in WO98/37437).

A particular advantage of using the approach of US 2004/0260476 for extracting connected horizon surfaces is that it can provide robust and versatile solutions even when faulted or chaotic regions are encountered.

More generally, extrema classification methods for horizon extraction can provide very good characterization of the local signal shape, as well as shape similarity throughout the area of interest. Furthermore, when data are transformed into a new domain of relative time of deposition (details of the transformation are discussed below), signal shape information can be preserved in the new domain.

Figure 1:
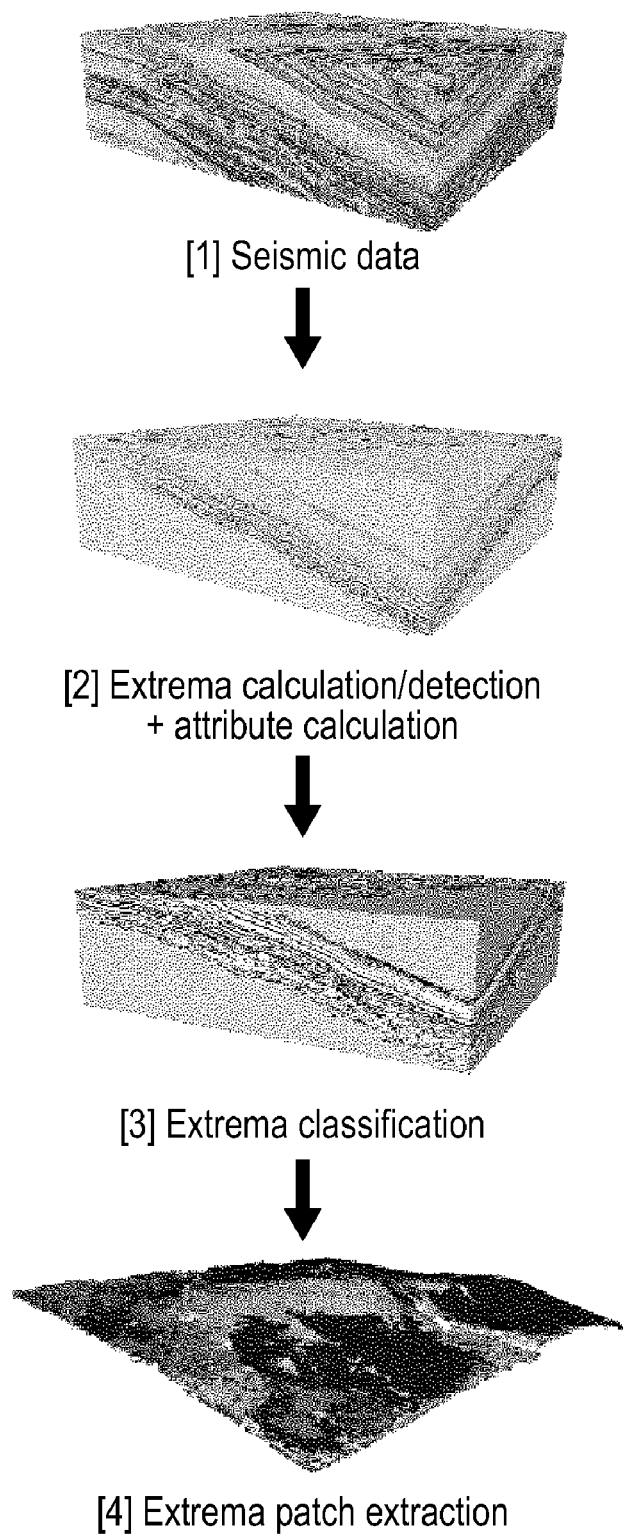
FIG. 1 shows schematically an extrema classification workflow.

FIG. 1 shows schematically an extrema classification workflow with seismic data 1 being operated on by an extrema detection algorithm to identify extrema positions 2. The extrema are then classified into classes 3 on the basis of e.g. similar extrema signal shapes. Finally, three-dimensionally connected classes are extracted as horizon surface primitives 4.

Chronostratigraphic Modelling

Having obtained data for a geological volume in the form of horizon surfaces within the volume, it remains to assign respective relative geological ages to the horizon surfaces.

In general terms this can be accomplished by extending a plurality of spaced sampling traces through the volume to traverse the horizon surfaces. The horizon surfaces are then associated with relative geological ages such that, on each sampling trace, the relative geological age of each horizon surface traversed by the sampling trace in the direction from geologically younger to geologically older horizon surfaces is increased in relation to the relative geological age of its preceding horizon surface. However, each horizon surface must take the same relative geological age across all the sampling traces by which it is traversed.

Figure 2A:
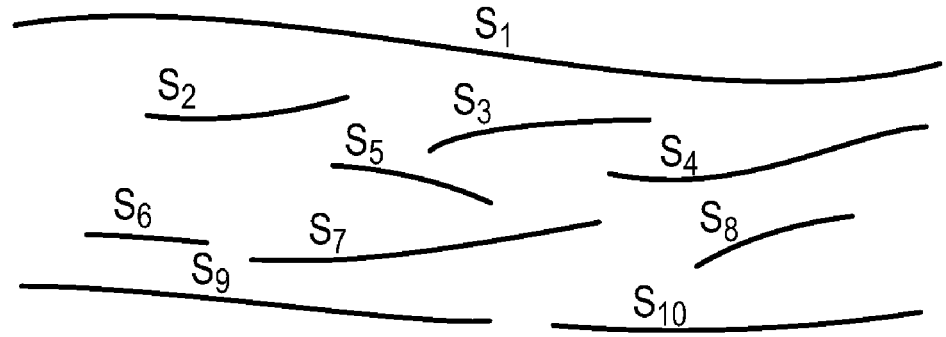
FIG. 2 shows (a) a schematic vertical section through the horizon surfaces of a geological volume, (b) the same vertical section but with vertical sampling traces extending through the volume, and (c) the same vertical section with arrows added to the traces to represent ordering relations.
Figure 2B:
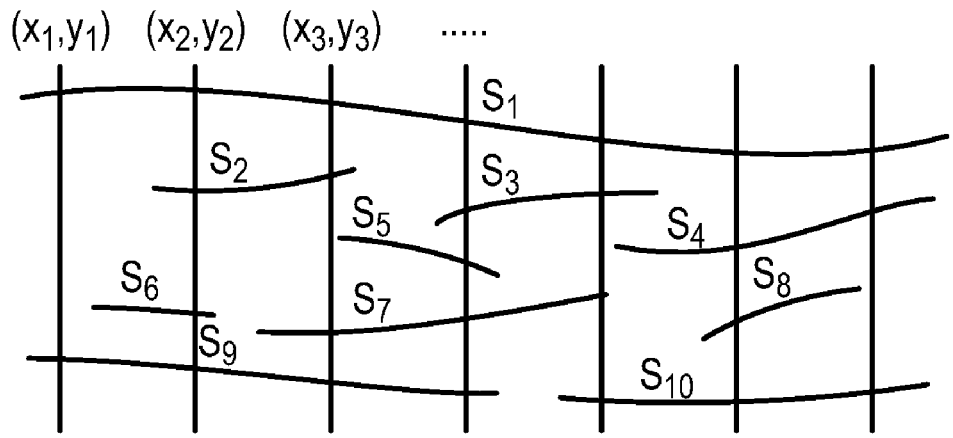

FIG. 2(a) shows schematically a vertical section through the horizon surfaces of a geological volume, the horizon surfaces having unique identifiers $S_1$-$S_{10}$. FIG. 2(b) shows the same vertical section as FIG. 2(a), but now with vertical sampling traces identified by respective surface coordinates $(x_n, y_n)$ extending from top to bottom through the volume. The traces intersect the horizon surfaces at positions marked by crosses.

Figure 2C:
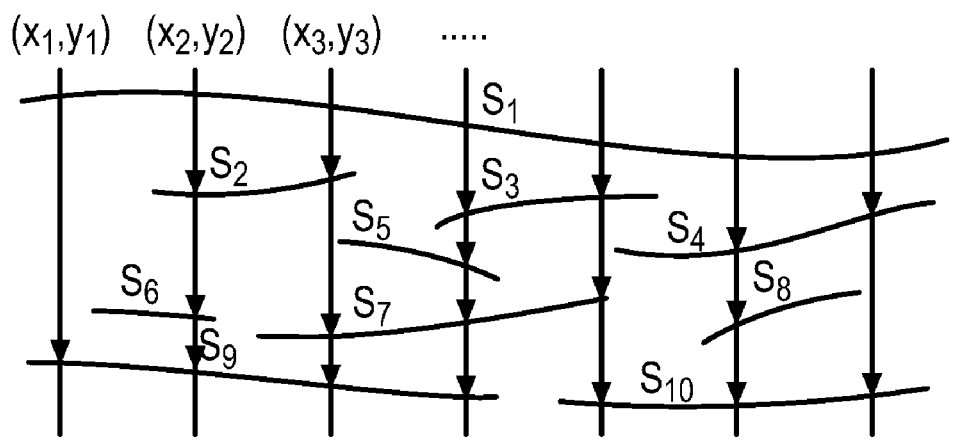

Arrows added to the traces in FIG. 2(c) then represent the ordering relation between horizon surfaces on the traces. Taking the relative geological age of the uppermost horizon surface $S_1$ as the most recent, the ordering relations can be expressed as a set of partial orderings:

$t(s_1) < t(s_9)$ $t(s_1) < t(s_2)$ $t(s_2) < t(s_6)$ $t(s_6) < t(s_9)$ $t(s_2) < t(s_7)$ $t(s_7) < t(s_9)$ $t(s_1) < t(s_3)$ $t(s_3) < t(s_5)$ $t(s_5) < t(s_7)$ etc.
where t( ) denotes relative geological age.

This set of partial orderings fulfils the formal requirements of a partially ordered set, or poset (see e.g. R. P. Grimaldi, *Discrete and combinatorial mathematics—An applied introduction*, Addison-Wesley, 3rd edition, 1994). A poset is defined as a set with a partial ordering≦on it fulfilling the requirements of reflexivity, anti-symmetry, and transitivity.

Figure 3:
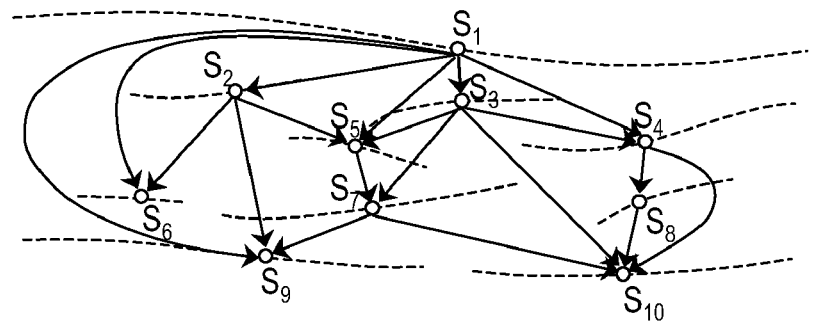
FIG. 3 shows a directed acyclic graph for the ordering relations of FIG. 2(c)

Generally, any poset can be represented in the form of a directed acyclic graph (DAG), where the nodes of the DAG are the elements of the poset and there is a directed path from node a to node b if and only if a<b. FIG. 3 shows a DAG for the ordering relations of FIG. 2(c) associated with the horizon surfaces (indicated with dashed lines) of FIG. 2(a).

A poset contains information on how subsets of its elements relate to each other. A totally ordered set, also referred to as a linearly ordered set, on the other hand, specifies how all the elements in the set relate to each other. It has the added requirement over a poset that for all elements a, b in the set, either a≦b or b≦a. Thus, in the case of a DAG, the totally ordered set determines a specific (but not necessarily unique) order in which to visit the nodes so that whenever a new node is reached all of its predecessors have already been visited. This feature can be utilized to identify and label the longest paths from the top node to any of the nodes in the DAG. In general, the horizon surfaces of a geological volume will produce a poset, rather than a totally ordered set. However, a totally ordered set can be derived from a poset by topological sorting.

Algorithms for topological sorting of DAGs can be found for example in T. H. Cormen, C. E. Leiserson, and R. L. Rivest, *Introduction to algorithms*, MIT Press, 1996. This publication gives the following algorithms for performing topological sorting of a graph G by use of a depth-first-searching:

```
DFS(G)
1: For each vertex u in G
2:     color[u] = WHITE
3:     predecessor[u] = null
4: time[u] = 0
5: For each vertex u in G
6:     if color[u] = WHITE
7:         then DFS-VISIT(u)
DFS-VISIT(u)
1: color[u] = GRAY
2: discovery_time[u] = time = time + 1
3: For all descendants v of u
4:     if color[v] = WHITE
5:         then predecessor[v] = u
6:             DFS-VISIT(v)
7: color[u] = BLACK
8: finished_time[u] = time = time + 1
```

-continued

```
TOPOLOGICAL-SORT(G)
1: Do depth-first-search, DFS(G), to determine finishing times for each
   node.
2: Place the nodes in front of a linked list as they are finished.
3: Return the linked list of nodes.
```

Figure 4A:
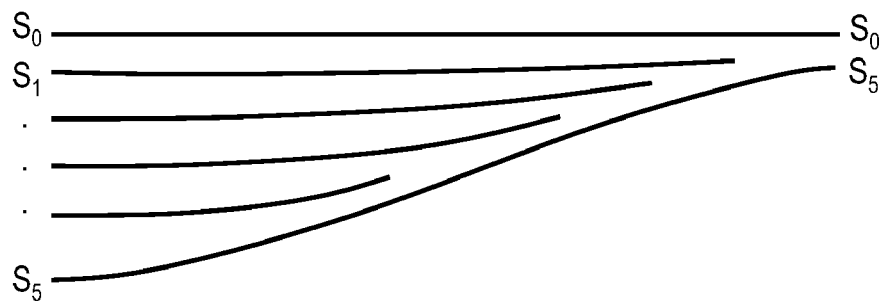
FIG. 4 shows (a) a schematic sequence of onlapping reflectors, (b) their corresponding directed acyclic graph, and (c) the longest path through the directed acyclic graph.
Figure 4B:
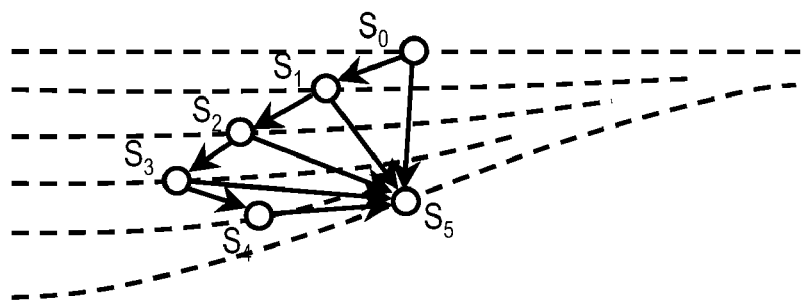
Figure 4C:
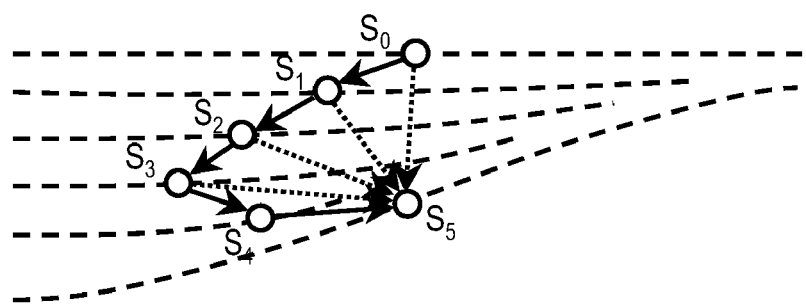

The use of longest path calculations to infer geological ages is illustrated in FIGS. 4(a) to (c). FIG. 4(a) shows a set of onlapping reflectors. Their corresponding DAG is shown in FIG. 4(b). The correct geological age labelling, or time stamping, follows the unique identifiers $S_1$ to $S_5$, and is obtained by traversing the longest path through the graph, shown in FIG. 4(c). Age labelling may also be seen as a time stamping problem in a distributed system (see e.g. L. Lamport, *The temporal logic of actions*, ACM Trans. Program. Lang. Syst., 16(3):872-923, 1994). Time stamping nodes according to their linear order, ensures that by the time a particular node is evaluated all of its preceding nodes have already been time stamped.

Figure 5:
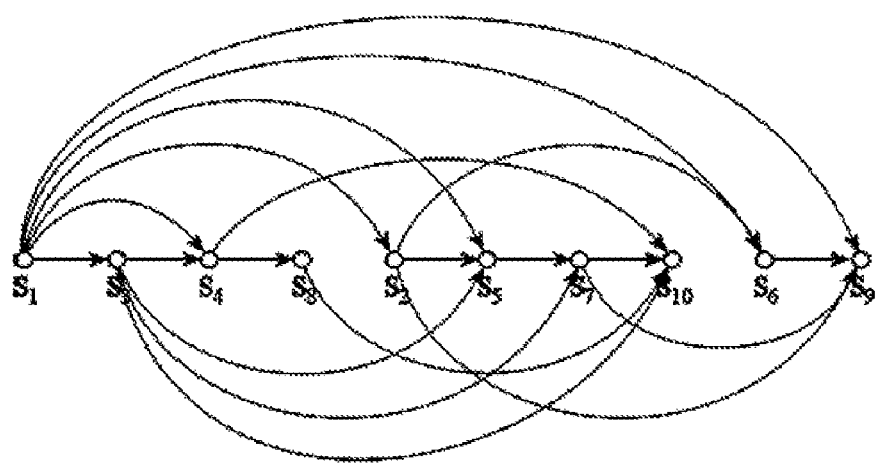
FIG. 5 shows the linearly ordered nodes of the directed acyclic graph of FIG. 3.

FIG. 5 shows the nodes of the DAG of FIG. 3, but now in a linear order. The linear order obtained in this manner is not necessarily unique. In fact, the number of possible linear orders can grow exponentially with the size of the DAG. However, despite this non-uniqueness, geological age calculations based on longest path calculations are still unique and can be made, for example using the following algorithm:

```
1: Initialize geological ages, t( ), for all nodes to 0.
2: for each node u in topologically sorted order,
3:     for all descendants v of u,
4:         t(v) = max(t(v), t(u) + 1).
5: Return the table of time stamps.
```

Due to the linear ordering of the nodes, each edge only needs to be traversed once.

As a zero geological time reference, a top reference node can be introduced connecting to all upwardly unconstrained exposed horizons. Similarly, a reference node can be attached at the bottom. The geological ages computed on this augmented graph are, thus, relative to the top node.

With reference to the direction of the sampling traces of FIG. 2b, the adjusted age, t(u)+1, of step 4 of the algorithm is an increment of increasing age. However, the procedure discussed above can also be applied with the direction of the sampling traces reversed (i.e. the traces starting at geologically older, lower horizon surfaces and ending at younger, higher surfaces). The adjusted age, t(u)+1, of step 4 of the algorithm will then be an increment of decreasing age. In this scenario, if top and bottom references nodes are used, the geological ages will be relative to the bottom node.

Figure 6:
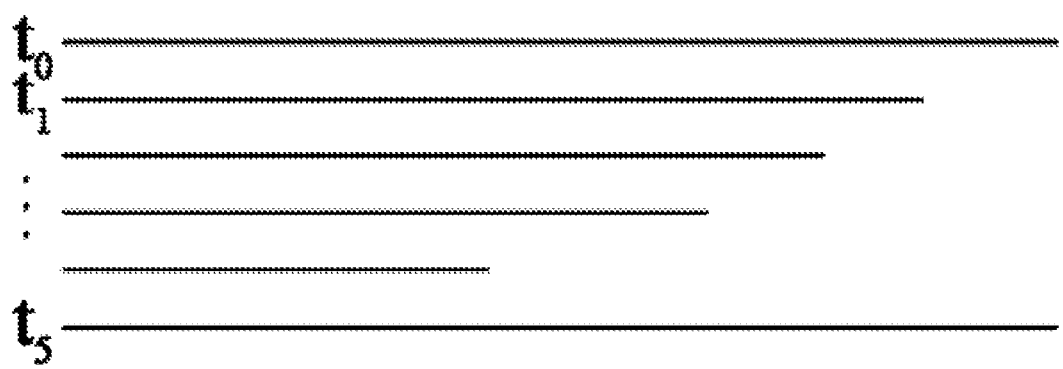
FIG. 6 shows a vertical section through a chronostratigraphic chart for the onlapping sequence of FIG. 4(a)

A chronostratigraphic chart can be constructed by plotting all horizon surfaces according to their observed horizontal extent and using calculated relative geological age as the vertical coordinate. The resulting representation reveals the depositional history of the observed data. A simple example is seen in FIG. 6 where the onlapping sequence of FIG. 4(a) is transformed and plotted according to relative geological age.

Figure 7A:
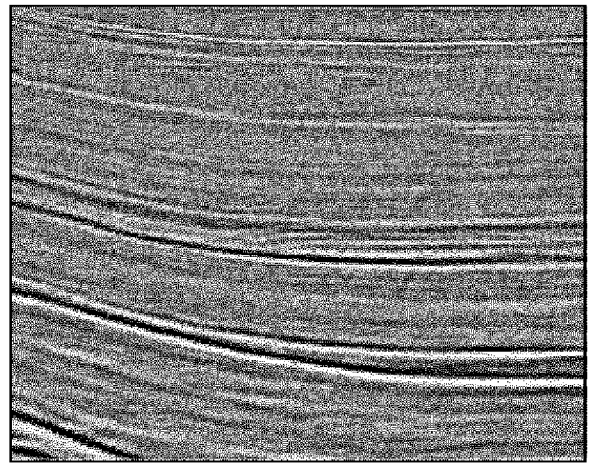
FIG. 7 shows (a) a vertical section though part of a seismic data set, and (b) a corresponding chronostratigraphic chart.
Figure 7B:

FIG. 7(a) displays a vertical section though part of a real seismic data set with pronounced sedimentary sequences. From this image, extrema patches were extracted and subjected to partial ordering, topological sorting and geological age calculation as discussed above. From this procedure, a chronostratigraphic chart emerged as shown in FIG. 7(b).

Both positive and negative extrema are included in the calculations, and are plotted with different grey scales in the chart.

Figure 8:
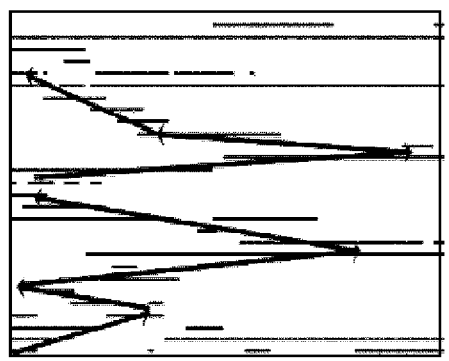
FIG. 8 is a magnified view of the lower left part of the chart of FIG. 7(b), the direction of deposition being highlighted using arrows.

The chronostratigraphic chart can be interpreted and related to patterns in the seismic data, with which the chart has a one-to-one relationship. For example, typical stacking patterns where layers have been progradationally, aggradationally and retrogradationally deposited can be identified in the chart of FIG. 7(b). This is particularly pronounced in the lower left part of the relative chronostratigraphic chart, which is shown in magnified view in FIG. 8.

Complex subsurface structures, sub-optimal processing and inadequate seismic resolution may render real seismic images unfocussed and noisy. Performing surface horizon detection and interpretation under these conditions often produces spatially discontinuous horizons, which can affect the relative geological age calculations.

However, major sequence boundaries are generally more pronounced and continuous than surrounding sediments, yielding larger, spatially continuous horizons. Such larger horizons self-calibrate geological age calculations due to the large number of precedence relations generated by them. More specifically, the likelihood that a large horizon of a major sequence boundary will be included in a longest path is relatively large. Indeed, in the extreme case, all possible paths from top to bottom may cross a particular horizon. When this happens, the longest path calculation is in reality reset at this horizon.

If part of the seismic data is wrongly allocated to two or more horizon surfaces when in reality it derives from the same surface, user interaction or an automated approach (e.g. based on extrema classification as discussed in US 2004/0260476) may be applied to select, group and re-date the surfaces that have been erroneously time stamped. The selected nodes may then be replaced by a new node in the DAG having the selected nodes' predecessors as its predecessors and their descendants as its descendants. Generally, the oldest time stamp among the selected surfaces should be used as the new, common time stamp. The distance calculations can then be updated e.g. using the following algorithm:

```
1: Initialize list L with the new node n.
2: Initialize time stamps, t( ), with current time stamps of all nodes
3: for each node u in L,
4:     for all descendants v of u,
5:         if t(v) < t(u) + 1,
6:             t(v) = t(u) + 1,
7:             Add v to L.
8: Return the table of updated time stamps.
```

If the algorithm reaches a node where no change in geological age assignment occurs, it stops tracing that particular path, which is correct as from this point on there is another path of greater length coming from elsewhere. Hence, paths emanating from node n are traced until no more changes occur, leaving the original time stamps for the rest of the graph unchanged.

Thus the longest path calculation from the top node may be corrected using longest path calculations from the updated boundary. The only restriction on this process is that the grouping of nodes may not violate the over/under relationships already captured by the DAG. That is, the nodes can only be grouped if it is impossible for them to reach each other by traversing the DAG.

Interpreting Chronostratigraphic Charts

A chronostratigraphic chart is an alternative way of organizing seismic data. As explained earlier, there exists a oneto-one relationship between the events in the seismic time domain and in the relative geological age domain, providing a means to convert between the two domains. A natural consequence of this is that it is possible to perform real time cursor tracking between the two domains. Thus, if a user selects an area in a seismic domain he can immediately know the corresponding period in geological age. This mapping provides a powerful method by which to quality control the transform and to perform spatial navigation when interacting with the chronostratigraphic chart.

Figure 9A:
FIGS. 9 shows (a) a section through a chronostratigraphic chart and (b) a corresponding seismic chart, a selected time period in the geological age domain being highlighted in the seismic domain.
Figure 9B:
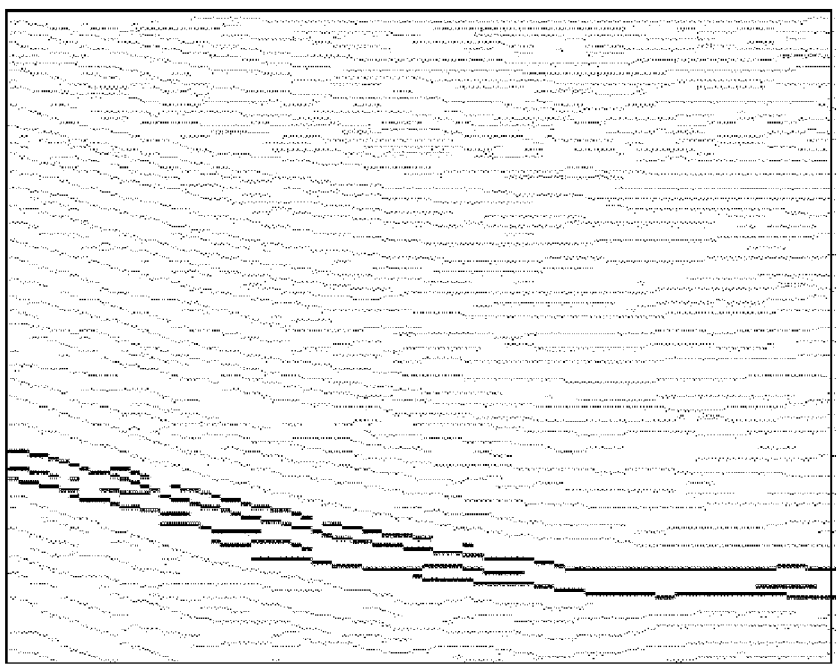

The reverse mapping from geological age to seismic travel time enables the user to select interesting stratigraphic sequences and then view them in the seismic domain. FIGS. 9(a) and (b) respectively show sections through a chronostratigraphic chart and a corresponding seismic chart with a selected time period in the geological age domain highlighted in the seismic domain.

Thus the user can analyze specific stacking patterns, such as progradations and retrogradations, in the chronostratigraphic chart, select and label them, and thereby identify them and analyse their behaviours in the seismic domain.

The mapping between the two domains is in principle only valid along the horizon surfaces. However, by interpolation, the mapping may be extended to the cover the space in between the surfaces, thus rendering transformation between the two domains possible for all 3D coordinates and any type of information.

A useful approach to obtaining an overall understanding of the geological history of a volume is to animate the deposition of sediments. Utilizing the one-to-one relationship, we can introduce horizon surfaces in the seismic domain in their date-stamped order. The effect seen in the seismic domain is a playback of the sedimentation process. FIG. 10 is a series of six images from such a playback.

Intersecting the three-dimensional chronostratigraphic chart generates valid, two-dimensional chronostratigraphic charts, capturing the depositional history of specified seismic sections. The sampling lines belonging to such a two-dimensional section and their precedence relations are by definition recorded in the full three-dimensional set of sampling lines. Hence, the chronostratigraphic chart revealing the depositional history observed in a seismic section can be obtained by extraction of a two-dimensional section from the full three-dimensional chronostratigraphic chart using the horizontal coordinates of the seismic section of interest.

Major sequence boundaries are often more pronounced than surrounding sediments, yielding larger and more continuous horizon surfaces. Each horizon surface may have an associated set of properties describing e.g. its size, average and maximum seismic signal strength etc.

For example, FIGS. 11(a) and (b) show respectively a section through a chronostratigraphic chart and a histogram of the summed horizon surface sizes at each geological age of the chart. The histogram tends to peak at major sequence boundaries. Using these peaks as a guide, the histogram can be partitioned into periods of geological age, and the seismic volume may then be partitioned accordingly. Hence, we can obtain a segmentation of the seismic volume into stratigraphic units.

Figure 12:
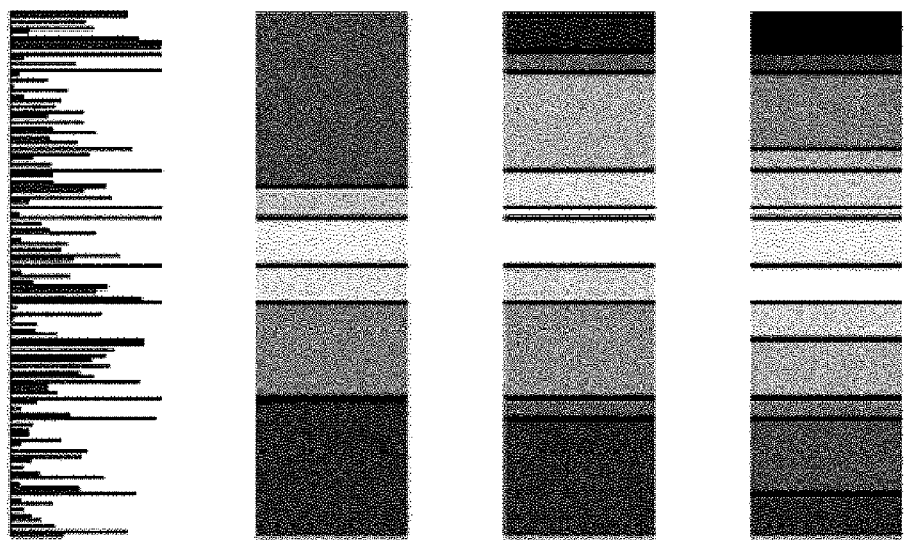
FIG. 12 shows three different levels for a partition hierarchy of the histogram of FIG. 11(b)

Numerous methods and criteria are viable for partitioning such histograms, one of which is the multiscale version of watershedding (see e.g. L. Vincent and P. Soille, *Watersheds in digital spaces: An efficient algorithm based on immersion simulations*, IEEE Trans. Pattern Analysis and Machine Intelligence, 13(6):583-598, 1991, and E. Monsen, T. Randen, L. Sønneland, and J. E. Odegard, *Mathematical Methods and Modeling in Hydrocarbon Exploration and Production*, volume 6 of *Mathematics in Industry*, chapter Geological Model Building: A Hierarchical Segmentation Approach, pages 213-246, Springer-Verlag, Heidelberg, 2004). The watershed transform partitions a signal into a set of catchment basins, which is the area between two consecutive extrema. Hence, a partition contains exactly one minimum and is bounded on both sides by extrema. A multiscale version of this algorithm is obtained by merging less contrasted partitions with neighbouring partitions to produce larger partitions. Such an arrangement produces a hierarchy of partitions, where the more detailed partitions reside inside the coarser partitions. Three different levels of such a hierarchy are depicted in FIG. 12 for the histogram of FIG. 11(b).

Figure 13:
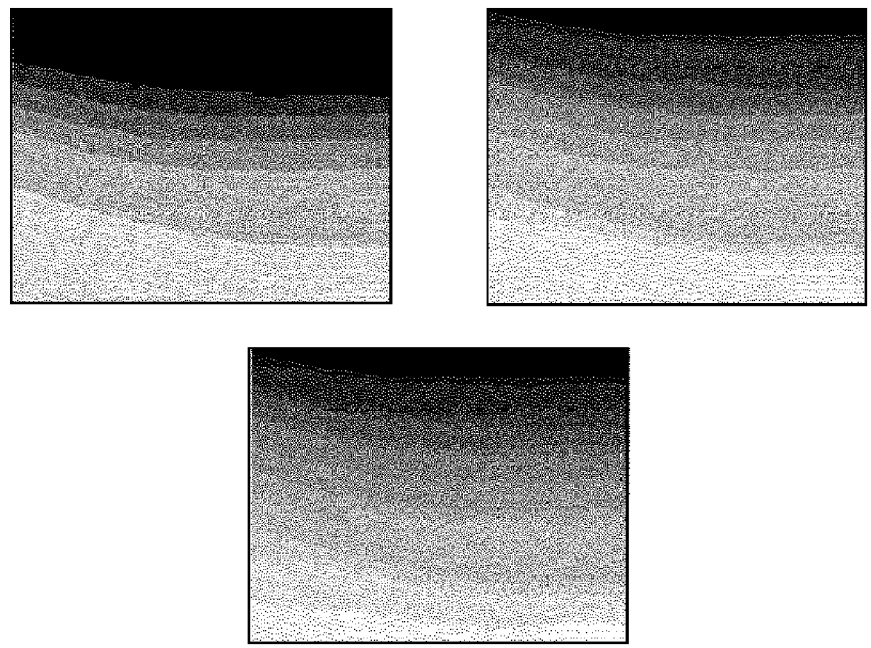
FIG. 13 shows a section through the corresponding seismic volume for the three partition levels of FIG. 12.

The partitioning of geological age into periods corresponds to a partitioning of the chronostratigraphic chart. Transforming these periods to the seismic domain, yields a partitioning of the seismic data according to geological time periods. FIG. 13 shows a section through the corresponding seismic volume for the three levels of partition of FIG. 12.

Stratigraphically Complex Settings

Chronostratigraphic chart construction in faulted stratigraphic areas is challenging, since the chronostratigraphic ordering is no longer "uniquely" defined. Faulting rearranges the sediments causing old and young sediments to lie opposite each other. In the case of reverse faults, old sediments lie on top of younger violating the default chronology. Hence, if left unaccounted for, faulting can cause topological sorting and dating to give false results.

However, the approach to building chronostratigraphic charts described above is still valid to either side of a fault. Thus, respective chronostratigraphic charts for separate fault blocks can be produced.

Figure 14A:
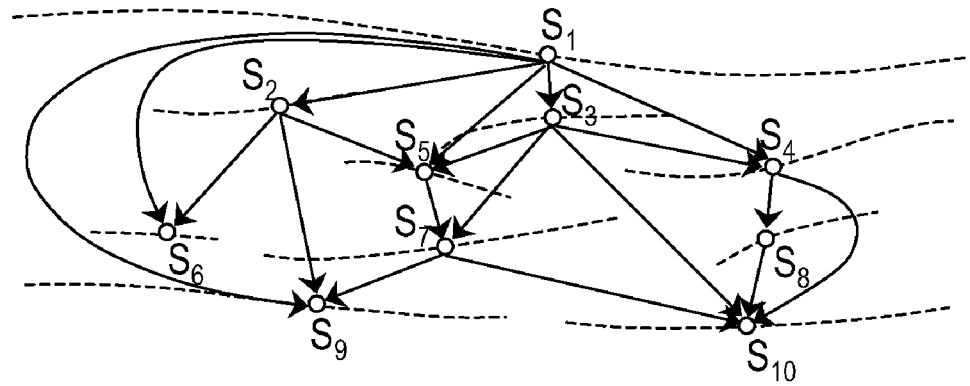
FIG. 14 shows (a) a schematic vertical section through the horizon surfaces of a geological volume and a corresponding directed acyclic graph, (b) the same vertical section but with an introduced fault implicitly cutting some of the sampling lines used to determine the partial ordering of sediments, and (c) the directed acyclic graph updated by removing the edges associated with the partial order relations disrupted by the fault.
Figure 14B:
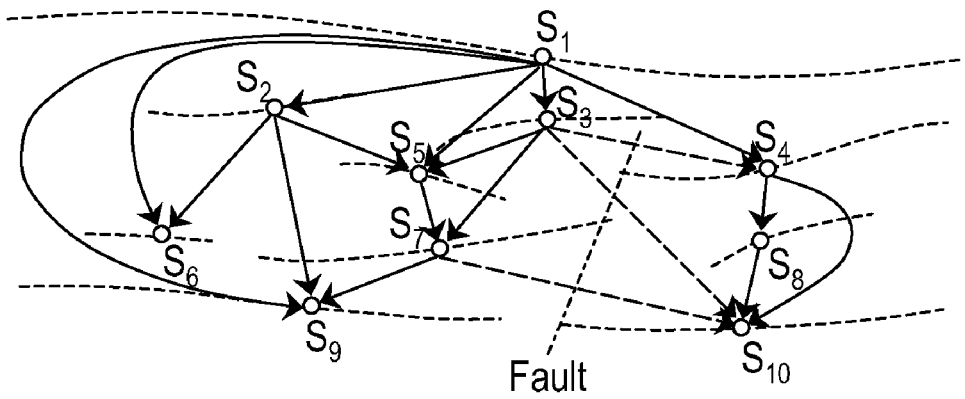
Figure 14C:
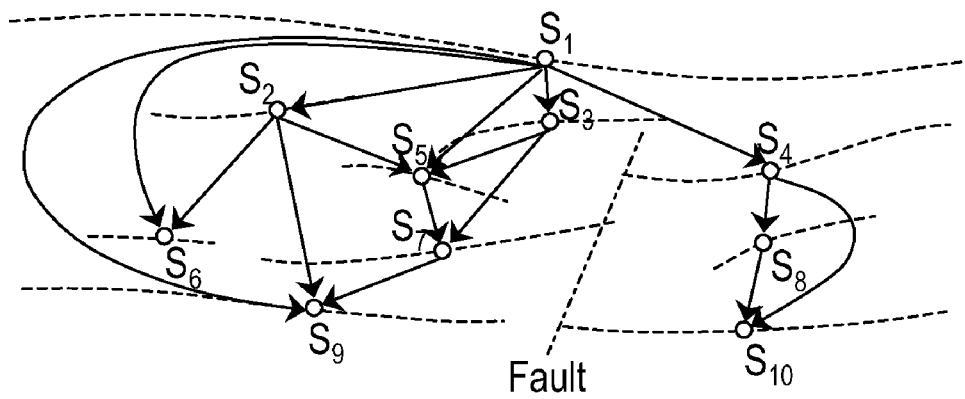

Furthermore, when fault blocks are bounded above and below by common sequence boundaries, their respective smaller chronostratigraphic charts may be incorporated into a larger chronostratigraphic chart for the overall region. FIGS. 14(a) to (c) show schematically how a fault can be accounted for in the creation of a DAG, and thus respected in the final relative chronostratigraphic chart. Essentially, a fault violates the partial ordering relations recorded along the sampling lines, so that one cannot initially determine the relative ages of sediments that are stacked on top of each other across the fault. By removing the edges associated with the set of no longer valid partial order relations, an updated DAG is created that respects the vertical sorting on either side of the fault and results in an independent assignment of relative ages to either side of the fault.

Though, initially independent, it is possible to assign correct relative ages to both sides of the fault by utilizing extrema classified horizon patches. If horizon patches of a certain signal class are found on both sides of the fault, it is likely that these initially came from the same horizon surface (see H. G. Borgos, 2004, *Mathematical Methods and Modeling in Hydrocarbon Exploration and Production*, volume 6 of Mathematics in Industry, chapter Automated structural interpretation through classification of seismic horizons, pages 89-106, Springer-Verlag, Heidelberg) and, thus, should be assigned the same relative geological age. In fact, chronologically matching a sequence of horizon patches and their classes across the fault strengthens the validity of such an assumption.

The use of DAGs to capture partial ordering relations also has an advantage in that it provides a means to combat erroneous input data such as impossible stacking orders in classified seismic data. For example, in highly complex stratigraphic settings it is challenging to identify and extract horizon surfaces automatically. Due to extreme connectivities, the extraction of isolated connected components can often fail, and stratigraphically separate horizon surfaces can be erroneously connected. In some instances, it is then observed that stacks of horizon surfaces form loops, where the last surface of the sequence is stacked on top of the first surface. However, in a DAG this situation would introduce a cycle, violating the acyclicity criterion.

Identification of such cycles can be performed in linear time with a depth first search algorithm adapted to detect back edges, e.g. as described in T. H. Cormen, C. E. Leiserson, and R. L. Rivest, *Introduction to algorithms*, MIT Press, 1996. Hence, by initially running this algorithm, detecting and breaking up cycles, erroneous input data can be corrected.

Uses of Chronostratigraphic Charts (1) Geobodies

Figure 15:
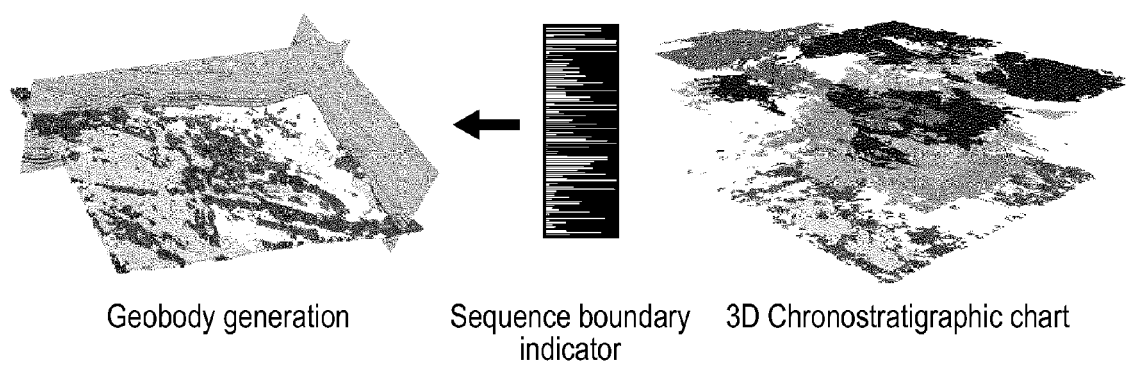
FIG. 15 shows schematically a workflow for generating a geobody from a chronostratigraphic chart.

The horizon surfaces can be used in the extraction and manipulation of volume primitives, or geobodies. A geobody can be defined as the closed volume between two horizons, allowing a sequence of horizons internally in the geobody. The top and the base of a geobody can be, for example, the top and base horizons of a reservoir, or (as shown schematically in FIG. 15) a set of major sequence boundaries identified using the chronostratigraphic chart.

The selected set of bounding and internal surfaces must all be respected when defining the associated geobody. A simple approach for deriving the geobody is to keep the common parts of the top and base defining surfaces and insert vertical boundaries along the edges. A more general approach would be to use a wrapping technique whereby a surface is shrink-wrapped to enclose all the surfaces and create a volume. There are standard algorithms which can be found in the computer graphics literature for implementing these approaches.

A similar technique as applied for extracting horizon patches can also be applied to extract geobodies. Instead of looking for homogeneity along single seismic horizons, as was the case for extracting horizon patches, the waveform of the full extrema sequence is now considered. Thus the volume is divided simultaneously based on changes of all internal interfaces. A reservoir can then be partitioned into closed volumes of homogeneous seismic response, with changes in e.g. saturations or lithology resulting in different classes and hence separate geobodies. The geobodies can further be populated with geophysical properties derived from, but not limited to, well logs or seismic inversion. The external geometry of the geobodies and their associated geophysical properties are valuable input in a reservoir model building workflow.

As for horizon patches, geobodies can be stored as geometry primitives, with the inclusion of additional properties along with the coordinates. Typical properties of interest are the class index, number of extrema within the geobody, the volume of the geobody and the amplitude at its surface.

The ability to generate geobodies whose boundaries are those identified and selected through the chronostratigraphic chart further allows the user to infer the total volume of sediments deposited in individual geological time periods. This is important information in order to understand and model the geological processes that acted when the sediments were deposited and thus what lithologies to expect.

(2) Constrained Inversion

The set of wave-form attributes associated with each horizon patch and geobody is a compact characterization of the local signal shape (i.e. it represents a compressed version of the original seismic signal). This information is available for every point of the flattened surfaces and bodies in the relative chronostratigraphic domain. Hence, it is possible to perform seismic inversion in this new domain. In fact, performing inversion in the relative chronostratigraphic domain is a simpler task than in the observation domain due to the simplification of geometry resulting from flattening of events. Inversion of geophysical properties from seismic amplitude measurements is very well documented in the literature and would be readily integrated in the chronostratigraphic domain by the person skilled in the art.

(3) Pattern Recognition/Searching

Seismic facies are defined in terms of their external shape and internal texture (see R. M. Mitchum, P. R. Vail and J. B. Sangree, 1977, *Seismic stratigraphy applications to hydrocarbon exploration*, chapter Seismic stratigraphy and global changes of sea level, part 6-7, AAPG Memoir 26, and J. Schlaf, T. Randen and L. Sonneland, 2004, *Mathematical Methods and Modeling in Hydrocarbon Exploration and Production*, volume 6 of Mathematics in Industry, chapter Introduction to seismic texture, pages 3-21, Springer-Verlag, Heidelberg). The DAG representation discussed above captures the order in which sediments are deposited, and as such is a representation of the depositional architecture. Hence, we can express the arrangement of sediments for various seismic facies by their corresponding DAG, and perform graph matching/searching in order to extract the positions in the data where sediments resemble particular seismic facies types. One example would be to search for onlapping events, as characterized by the DAG in FIG. 4(b). An overview of both exact and inexact methods for graph matching can be found in E. Bengoetxea, 2002, *Inexact Graph Matching Using Estimation of Distribution Algorithms*, PhD thesis, Ecole Nationale Superieure des Telecommunications.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention. All the references cited above are hereby incorporated by reference.

The invention claimed is:

1. A method of processing stratigraphic data comprising a plurality of stratigraphic features within a geological volume, the method including the steps of:

providing the stratigraphic data to a processor;

using the processor to extend a plurality of spaced sampling traces through the volume to traverse the stratigraphic features;

using the processor to provide each stratigraphic feature with a unique identifier;

for each sampling trace, using the processor to determine a sequence order of the unique identifiers of successively traversed stratigraphic features, the sequence orders either all starting at the unique identifiers of geologically younger stratigraphic features and ending at the unique identifiers of geologically older stratigraphic features, or all starting at the unique identifiers of geologically older stratigraphic features and ending at the unique identifiers of geologically younger stratigraphic features;

using the processor to assign-the stratigraphic features respective relative geological ages by sorting the unique identifiers into a linear order so that each descendant unique identifier appears later in the linear order than its parent unique identifier, a descendant unique identifier and its parent unique identifier being adjacent unique identifiers in a sequence order with the parent appearing before the descendant, such that, on each sampling trace, the relative geological age of each stratigraphic feature traversed by the sampling trace in the direction from geologically younger to geologically older stratigraphic features is increased in relation to the relative geological age of its preceding stratigraphic feature, under the condition that each stratigraphic feature takes the same relative geological age across all the sampling traces by which it is traversed; and outputting from the processor the stratigraphic features and their respective relative geological ages.

2. A method according to claim 1, wherein the stratigraphic features are surface horizons, geobodies or faults.

3. A method according to claim 1, wherein the step of assigning the stratigraphic features respective relative geological ages further comprises the substeps of:
  (i) associating the unique identifiers with respective initial relative geological ages;
  (ii) adjusting the relative geological ages of unique identifiers which are descendant unique identifiers of the first parent unique identifier in the linear order, whereby
  when the sequence orders start at the unique identifiers of geologically younger stratigraphic features, the adjustment is an increase in geological age if the relative geological age associated with the parent unique identifier is older than or the same age as the relative geological age associated with a descendant unique identifier, or
  when the sequence orders start at the unique identifiers of geologically older stratigraphic features, the adjustment is a decrease in geological age if the relative geological age associated with the parent unique identifier is younger than or the same age as the relative geological age associated with a descendant unique identifier; and
  (iii) repeating substep (ii) for the next and each subsequent unique identifier in the linear order which is a parent unique identifier.

4. A method according to claim 1, further including the step of:
  representing the stratigraphic features and their respective relative geological ages in a chronostratigraphic chart.

5. A method according to claim 1, wherein the stratigraphic data are obtained by labelling seismic data.

6. A method according to claim 5, wherein the labelling is performed by extracting extrema positions within the seismic data, whereby the stratigraphic data thus-obtained sparsely populates the geological volume.

7. A method according to claim 6, wherein the extraction is performed by classifying local signal shapes of the seismic data at extrema positions only.

8. A method according to claim 7, further including using the classified local signal shapes to adjust the relative geological ages of stratigraphic features on either side of a fault.

9. A method of processing seismic data including the steps of:
  performing seismic tests to obtain seismic data for a geological volume;
  labelling the seismic data to obtain stratigraphic data comprising a plurality of stratigraphic features within the geological volume; and
  performing the method of claim 1.

10. A method of controlling a well drilling operation including the steps of:
  performing the method of claim 1;
  using the stratigraphic data thus-processed to determine a well trajectory; and
  drilling a well having that trajectory.

11. A method including: representing a subterranean reservoir using the stratigraphic features and their assigned relative geological ages derived by the method of claim 1 to define boundaries of a geobody, associating the geobody with petro-physical properties, and combining the geobody with other geobodies to define at least a section of a reservoir.

* * * * *